United States Patent
Dasari et al.

(10) Patent No.: US 9,563,497 B2
(45) Date of Patent: Feb. 7, 2017

(54) CORRECTING A FAILURE ASSOCIATED WITH A CURRENT FIRMWARE IMAGE

(71) Applicant: LENOVO ENTERPRISE SOLUTIONS (SINGAPORE) PTE. LTD., Singapore (SG)

(72) Inventors: Shiva R. Dasari, Austin, TX (US); Scott N. Dunham, Raleigh, NC (US); Edward J. Klodnicki, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 347 days.

(21) Appl. No.: 13/719,805

(22) Filed: Dec. 19, 2012

(65) Prior Publication Data

US 2014/0173327 A1    Jun. 19, 2014

(51) Int. Cl.
*G06F 11/00* (2006.01)
*G06F 11/07* (2006.01)
*G06F 11/14* (2006.01)

(52) U.S. Cl.
CPC ....... *G06F 11/0793* (2013.01); *G06F 11/0736* (2013.01); *G06F 11/1417* (2013.01); *G06F 11/1433* (2013.01)

(58) Field of Classification Search
USPC .......................................................... 714/2
See application file for complete search history.

(56) References Cited

U.S. PATENT DOCUMENTS

| | | | |
|---|---|---|---|
| 7,809,836 B2 | 10/2010 | Mihm et al. | |
| 7,849,454 B2 | 12/2010 | Lambert et al. | |
| 2004/0103340 A1* | 5/2004 | Sundareson et al. | 714/6 |
| 2005/0229173 A1* | 10/2005 | Mihm et al. | 717/171 |
| 2007/0165040 A1* | 7/2007 | Wang et al. | 345/536 |
| 2008/0256526 A1 | 10/2008 | Ellsworth et al. | |
| 2010/0169709 A1 | 7/2010 | Chiu et al. | |
| 2011/0126043 A1* | 5/2011 | Anderson et al. | 714/6.1 |
| 2014/0325203 A1* | 10/2014 | Roche et al. | 713/2 |

* cited by examiner

*Primary Examiner* — Bryce Bonzo
*Assistant Examiner* — India Davis
(74) *Attorney, Agent, or Firm* — Edward J. Lenart; Katherine S. Brown; Kennedy Lenart Spraggins LLP

(57) ABSTRACT

Methods, apparatuses, and computer program products for correcting a failure associated with a current firmware image are provided. Embodiments include a firmware selection module detecting the failure associated with the current firmware image stored in firmware memory corresponding to a component of a system. Embodiments also include the firmware selection module selecting from a plurality of backup firmware images, a replacement firmware image based on a status of at least one backup firmware image in response to detecting the failure. Embodiments also include the firmware selection module storing the selected replacement firmware image in the firmware memory.

10 Claims, 4 Drawing Sheets

CORRECTING A FAILURE ASSOCIATED WITH A CURRENT FIRMWARE IMAGE

BACKGROUND OF THE INVENTION

Field of the Invention

The field of the invention is data processing, or, more specifically, methods, apparatuses, and computer program products for correcting a failure associated with a current firmware image.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In some servers, the service processor can perform the update of Pre-OS firmware components such as a Unified Extensible Firmware Interface ('UEFI'). The service processor has the ability to update or restore the pre-OS firmware in the event of a failure or firmware corruption. If a firmware corruption occurs after it has been running for a while, it is desirable to correct and restore the corrupted firmware to same state it was in prior to the corruption. However, it is also possible that a Pre-OS firmware failure occurs not because of corruption, but because of a defect in the firmware. The defect may be triggered by an unforeseen configuration or circumstance that is not properly handled by the firmware. In that situation, it is desirable to replace faulty firmware with a prior version of the Pre-OS firmware that did not contain the operational defect.

Firmware recovery mechanisms frequently provide for primary and backup images. When a firmware problem occurs, the backup version is used. If the backup contains a different version of the firmware than the primary image, this can cause problems when there are dependencies for operational features or behaviors that are not present or different in the backup version. Likewise if the backup image contains the same version of the firmware as the primary image, both images can contain the same operational defect. For example, if the firmware hangs when a certain adapter card get installed in the system, both primary and backup images will experience the same problem.

SUMMARY OF THE INVENTION

Methods, apparatuses, and computer program products for correcting a failure associated with a current firmware image are provided. Embodiments include a firmware selection module detecting the failure associated with the current firmware image stored in firmware memory corresponding to a component of a system. Embodiments also include the firmware selection module selecting from a plurality of backup firmware images, a replacement firmware image based on a status of at least one backup firmware image in response to detecting the failure. Embodiments also include the firmware selection module storing the selected replacement firmware image in the firmware memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
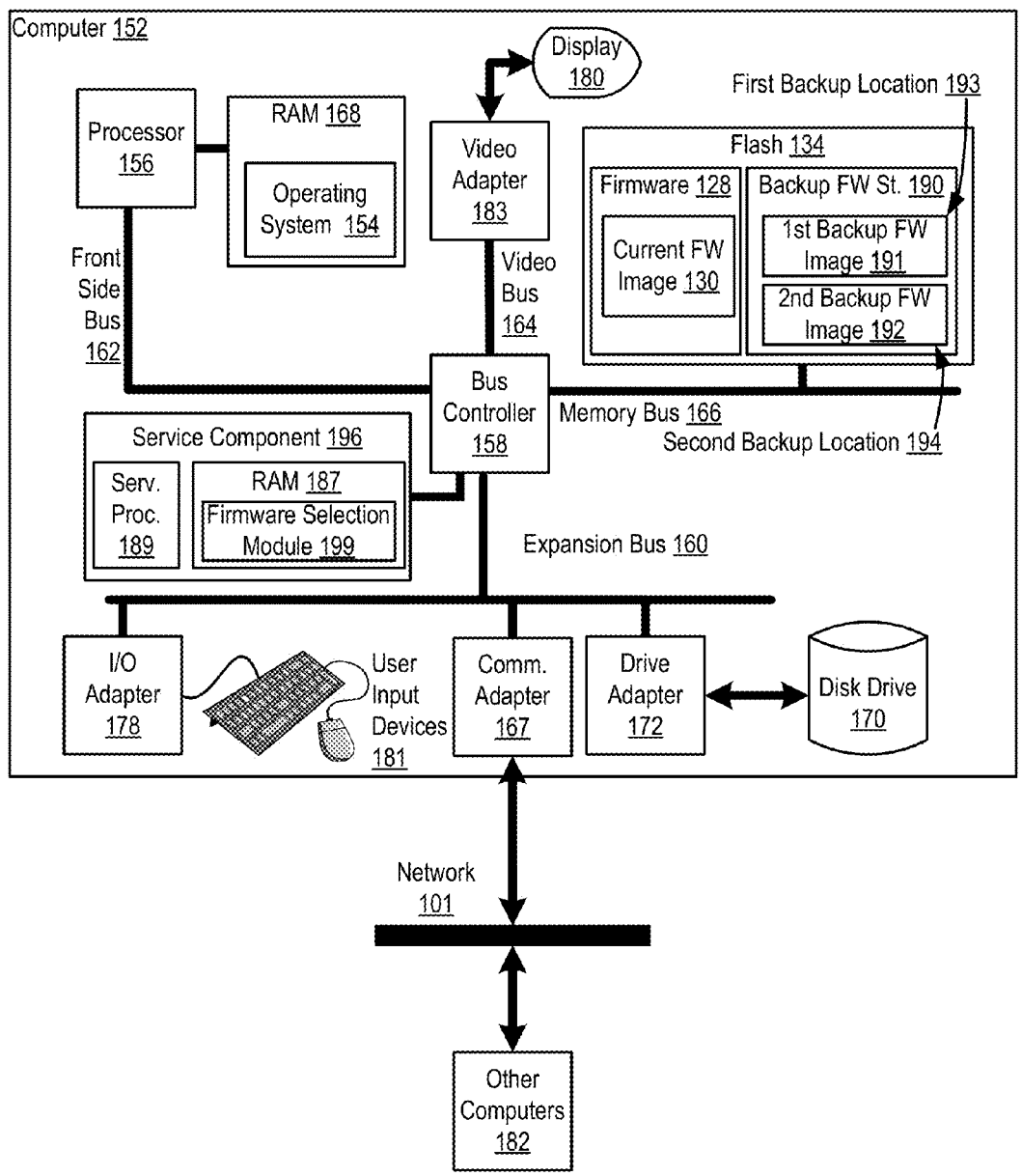
FIG. 1 sets forth a network diagram of a system for correcting a failure associated with a current firmware image according to embodiments of the present invention.

Exemplary methods, apparatuses, and computer program products for correcting a failure associated with a current firmware image in accordance with the present invention are described with reference to the accompanying drawings, beginning with FIG. 1. FIG. 1 sets forth a network diagram of a system for correcting a failure associated with a current firmware image according to embodiments of the present invention. The system of FIG. 1 includes a computing system—computer (152). The computer (152) of FIG. 1 includes at least one computer processor (156) or 'CPU' coupled to random access memory (168) ('RAM'). The processor is coupled to other components of the computer (152) through a bus controller (158). The computer (152) also includes Non-volatile memory in the form of Flash memory (134), which is coupled to memory bus (166).

Stored in RAM (168) is an operating system (154). Operating systems useful correcting a failure associated with a current firmware image according to embodiments of the present invention include UNIX™, Linux™, Microsoft XP™, AIX™, IBM's i5/OS™, and others as will occur to those of skill in the art. The operating system (154) in the example of FIG. 1 iS shown in RAM (168), but many components of such software typically are stored in non-volatile memory also, such as, for example, on a disk drive (170).

Stored within Flash memory (134) is a firmware memory (128) and a backup firmware storage (190) containing a first backup location (193) and a second backup location (194). The first backup location (193) includes a first backup firmware image (191) and the second backup location (194) includes a second backup firmware image (192). Although shown here stored in Flash memory (134), firmware capable of being managed and corrected in accordance with embodiments of the present invention may be stored in various memories within a computing system—within non-volatile or volatile memory and within any component of the computer (152), such as the communications adapter (167), disk drive adapter (172) or I/O adapter (178).

The computer (152) also includes a service component (189) that includes a service processor (196) and service processor RAM (187) for storing instructions for execution by the service processor (196). Stored in service processor RAM (187) is a firmware selection module (199), a module of computer program instructions that corrects a failure associated with a current firmware image (130) in accordance with embodiments of the present invention. For example, the service processor (196) may execute the computer program instructions to correct a failure associated with the current firmware image (130). The firmware selection module (199) may include computer program instructions for detecting the failure associated with the current firmware image (130) stored in firmware memory (128) corresponding to a component of a system. A component of a system may be a pre-operating system (Pre-OS) firmware component, such as a Unified Extensible Firmware Interface ('UEFI'). The firmware selection module (199) may be configured to select from a plurality of backup firmware images, a replacement firmware image based on a status of at least one backup firmware image in response to detecting the failure. The firmware selection module (199) may also be configured to store the selected replacement firmware image in the firmware memory (128).

The computer (152) of FIG. 1 includes disk drive adapter (172) coupled through expansion bus (160) and bus controller (158) to processor (156) and other components of the computer (152). Disk drive adapter (172) connects non-volatile data storage to the computer (152) in the form of disk drive (170). Disk drive adapters useful in computers for correcting a failure associated with a current firmware image according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus controller (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for correcting a failure associated with a current firmware image according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
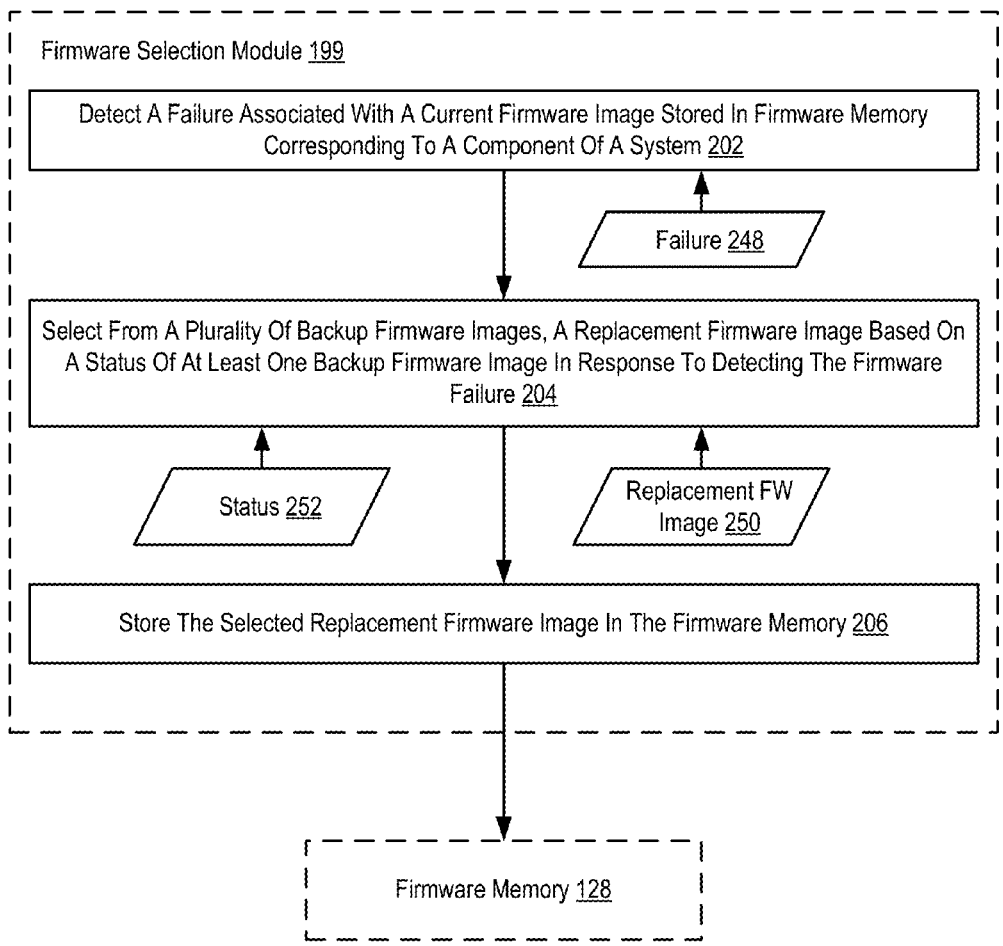
FIG. 2 sets forth a flow chart illustrating an exemplary method for correcting a failure associated with a current firmware image according to embodiments of the present invention.

For further explanation, FIG. 2 sets forth a flow chart illustrating an exemplary method for correcting a failure associated with a current firmware image according to embodiments of the present invention. The method of FIG. 2 includes the firmware selection module (199) detecting (202) the failure (248) associated with the current firmware image (130) stored in firmware memory (128) corresponding to a component of a system. An example of a component is a Unified Extensible Firmware Interface ('UEFI'). Detecting (202) the failure (248) associated with the current firmware image (130) stored in firmware memory (128) corresponding to a component of a system may be carried out by reading contents of the firmware memory (128) to retrieve the computer program instructions in the current firmware image (130); executing the instructions in the current firmware image (130); detecting a hang in the execution of the instructions; detecting a problem due to corrupted or unreadable instructions in the current firmware image (130); and determining that the system is unable to interact with the firmware component.

The method of FIG. 2 includes the firmware selection module (199) selecting (204) from a plurality of backup firmware images (191, 192), a replacement firmware image (250) based on a status (252) of at least one backup firmware image (191, 192) in response to detecting the failure (248). A backup firmware image is a firmware image that was previously used or is a copy of a firmware image that is currently being used (i.e., a copy of the current firmware image (130)). That is, the firmware selection module (199) keeps copies of the firmware images that it has previously used to update the firmware memory (128). Selecting (204) from a plurality of backup firmware images (191, 192), a replacement firmware image (250) based on a status (252) of at least one backup firmware image (191, 192) may be carried out by determining whether to correct a corrupted current firmware image (by replacing the current firmware image with an non-corrupted copy of the current firmware image) or replace the current firmware image with a different previously used firmware image.

A status of a firmware image indicates a reliability determination associated with the firmware image. For example, a backup firmware image may have a status of good, new, bad, or others as will occur to those of skill in the art. A 'good' status may be assigned by a service processor to a backup firmware image after the Pre-OS firmware has been run and passes certain criteria. A 'new' status may be assigned to a backup firmware image that was recently used to update the firmware memory. Backup firmware images with the 'new' status may not have been run or exercised sufficiently enough to determine whether or not the new firmware image contains a defect. A 'bad' status is assigned by a service processor if the service processor detects a problem with the pre-OS firmware and determines that the firmware memory is not corrupted (e.g., the current firmware image is not corrupted).

That is, according to embodiments of the present invention, the backup firmware storage (190) may include a copy of the current firmware image and a different previously used firmware image. Depending on the status of these images, the firmware selection module (199) may replace the current firmware image (130) with either the copy of the current firmware image or the different previously used firmware image. That is, the firmware selection module (199) may automatically choose the appropriate action when handling firmware failures.

The method of FIG. 2 includes the firmware selection module (199) storing (206) the selected replacement firmware image (250) in the firmware memory (128). Storing (206) the selected replacement firmware image (250) in the firmware memory (128) may be carried out by replacing the current firmware image with one of the backup firmware images.

Figure 3:
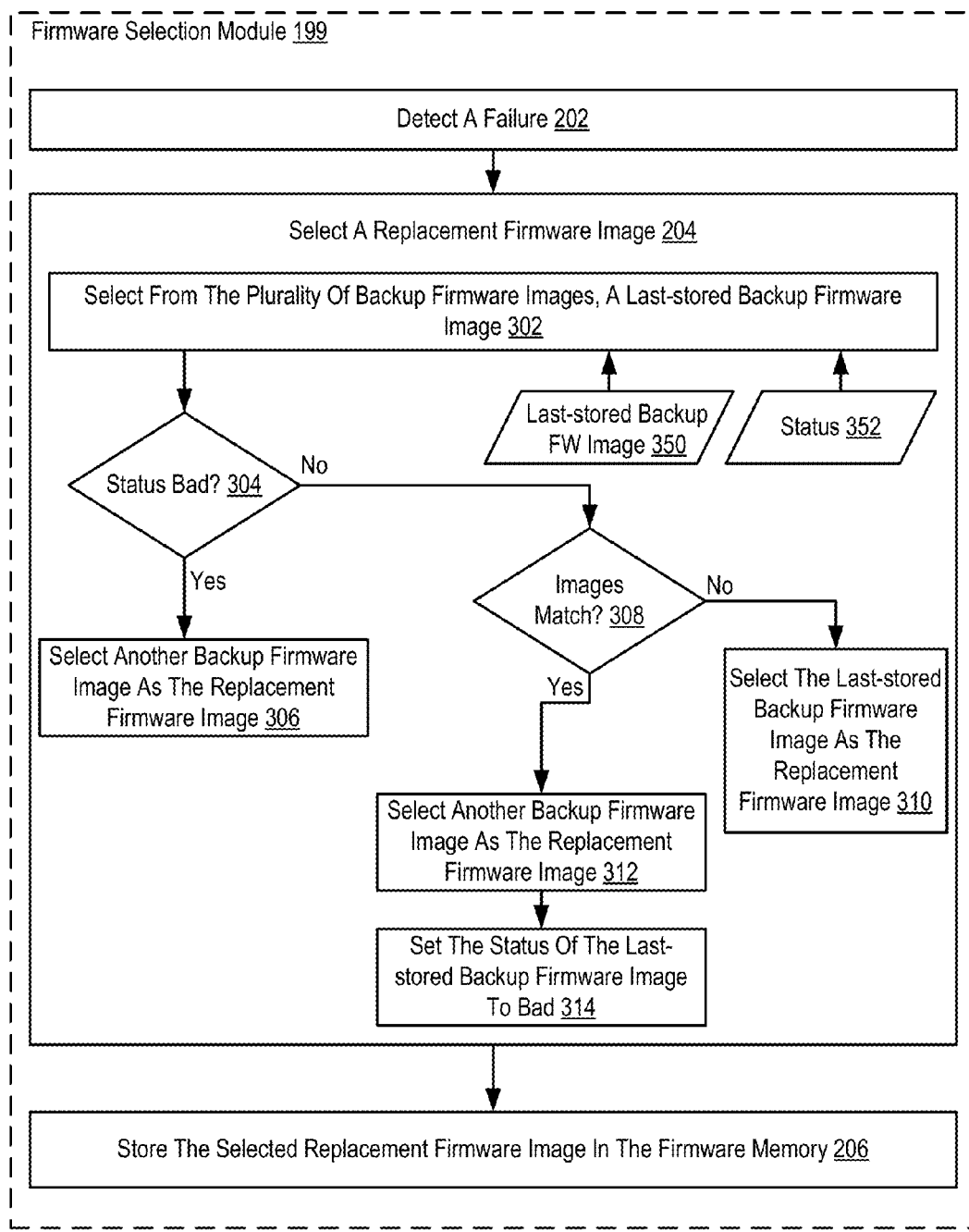
FIG. 3 sets forth a flow chart illustrating an exemplary method for correcting a failure associated with a current firmware image according to embodiments of the present invention.

For further explanation, FIG. 3 sets forth a flow chart illustrating an exemplary method for correcting a failure associated with a current firmware image according to embodiments of the present invention. The method of FIG. 3 is similar to the method of FIG. 2 in that the method of FIG. 3 also includes detecting (202) the failure (248) associated with the current firmware image (130) stored in firmware memory (128) corresponding to a component of a system; selecting (204) from a plurality of backup firmware images (191, 192), a replacement firmware image (250) based on a status (252) of at least one backup firmware image (191, 192) in response to detecting the failure (248); and storing (206) the selected replacement firmware image (250) in the firmware memory (128).

In the method of FIG. 3, however, selecting (204) from a plurality of backup firmware images (191, 192), a replacement firmware image (250) based on a status (252) of at least one backup firmware image (191, 192) includes selecting (302) from the plurality of backup firmware images (191, 192), a last-stored backup firmware image (350). Selecting (302) from the plurality of backup firmware images (191, 192), a last-stored backup firmware image (350) may be carried out by reading a status of a last_update flag indicating a location in the backup firmware storage (190) that contains the most recently stored backup image (i.e., a copy of the current firmware image). For example, the last_update flag may indicate the first backup location (193) contains a firmware image that was last used as the 'current firmware image.'

In the method of FIG. 3, selecting (204) from a plurality of backup firmware images (191, 192), a replacement firmware image (250) based on a status (252) of at least one backup firmware image (191, 192) includes determining (304) whether a status (352) of the last-stored backup firmware image (350) is bad. A 'bad' status is assigned by a service processor if the service processor detects a problem with the pre-OS firmware and determines that the firmware memory is not corrupted (e.g., the current firmware image is not corrupted). Determining (304) whether a status (352) of the last-stored backup firmware image (350) is bad may be carried out by examining a memory location dedicated to indicating a status of a particular backup firmware image.

If the status (352) of the last-stored backup firmware image (350) is bad, the method of FIG. 3 continues by selecting (306) another backup firmware image (191, 192) as the replacement firmware image (350). Selecting (306) another backup firmware image (191, 192) as the replacement firmware image (350) may be carried out by determining which backup firmware image was not the most recently saved; and examining a last_update flag. For example, if the first backup firmware image (191) is the last-stored backup firmware image and the status is 'bad,' the firmware selection module (199) may select the second backup firmware image (192) as the replacement image. In this example, the firmware selection module (199) has determined that the firmware memory (128) was not corrupted and that the detected failure is due to a problem with a non-corrupt firmware image. In this example, a different firmware image is need to fix the problem and the firmware selection module (199) selects a previously used backup firmware image stored in the backup firmware storage (190).

If the status (352) of the last-stored backup firmware image (350) is not bad, the method of FIG. 3 continues by determining (308) whether the current firmware image (130) substantially matches the last-stored backup firmware image (350). That is, the last-stored backup firmware image should be the same as the current firmware image. If these two images do not match, then the current firmware image in the firmware memory (128) is corrupted and should be replaced by the copy in the backup firmware storage (190). Determining (308) whether the current firmware image (130) substantially matches the last-stored backup firmware image (350) may be carried out by comparing the current firmware image to the last-stored backup firmware image.

If the current firmware image (130) does not substantially match the last-stored backup firmware image (350), the method of FIG. 3 continues by selecting (310) the last-stored backup firmware image (350) as the replacement firmware image (250). Selecting (310) the last-stored backup firmware image (350) as the replacement firmware image (250) may be carried out by identifying the location in the backup firmware storage (190) based on the last_update flag.

If the current firmware image (130) does substantially match the last-stored backup firmware image (350), the method of FIG. 3 continues by selecting (312) another backup firmware image (191, 192) as the replacement firmware image (250). Selecting (312) another backup firmware image (191, 192) as the replacement firmware image (250) may be carried out by select the backup firmware image not identified by a last_update flag. That is, if the two images match, then the current firmware image is not corrupted—it just produces failures in the component (i.e., its status is 'bad').

If the current firmware image (130) does substantially match the last-stored backup firmware image (350), the method of FIG. 3 continues by setting (314) the status (352) of the last-stored backup firmware image (350) to bad. Setting (314) the status (352) of the last-stored backup firmware image (350) to bad may be carried out by changing a bit in a memory location dedicated to indicating the status of the backup firmware image.

Figure 4:
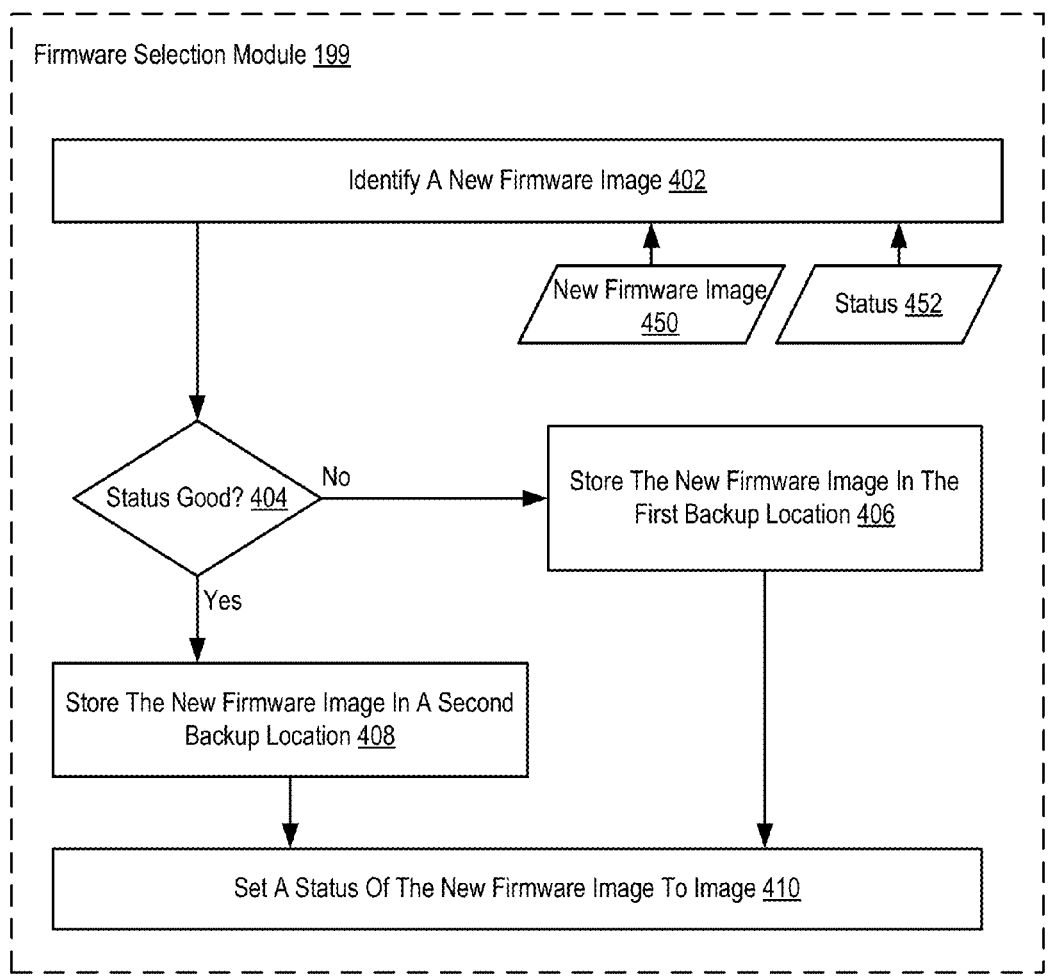
FIG. 4 sets forth a flow chart illustrating an exemplary method for correcting a failure associated with a current firmware image according to embodiments of the present invention.

For further explanation, FIG. 4 sets forth a flow chart illustrating an exemplary method for correcting a failure associated with a current firmware image according to embodiments of the present invention. The method of FIG. 4 includes the firmware selection module (199) identifying (402) a new firmware image (450). Identifying (402) a new firmware image (450) may be carried out by receiving a new firmware image from another component of the system.

The method of FIG. 4 also includes the firmware selection module (199) determining (404) whether a status (352) of the last-stored backup firmware image (350) is good. In a particular embodiment, the last-stored backup firmware image (350) is stored in a first backup location (193). Determining (404) whether a status (452) of the last-stored backup firmware image (350) is good may be carried out by examining a memory location dedicated to indicating a status of the particular backup firmware image.

If the status (352) of the last-stored backup firmware image (350) is not good, the method of FIG. 4 continues by the firmware selection module (199) storing (406) the new firmware image (450) in the first backup location (193). Storing (406) the new firmware image (450) in the first backup location (193) may be carried out by overwriting the previously stored backup firmware image with the new firmware image; and changing a last_update flag. That is, the new firmware image becomes the last-stored backup firmware image.

If the status (352) of the last-stored backup firmware image (350) is good, the method of FIG. 4 continues by the firmware selection module (199) storing (408) the new firmware image (450) in a second backup location (194). Storing (408) the new firmware image (450) in a second backup location (194) may be carried out by overwriting the second to last stored backup firmware image with the new firmware image; and changing a last_update flag. That is, the new firmware image becomes the last-stored backup firmware image.

The method of FIG. 4 also includes setting (410) a status (452) of the new firmware image (450) to new. Setting (410) a status (452) of the new firmware image (450) to new may be carried out by changing a bit in a memory location dedicated to indicating the status of the backup firmware image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that when executed by the computer processor cause the apparatus to carry out the steps of:
    detecting a failure associated with a current firmware image stored in firmware memory;
    in response to detecting the failure, selecting from a plurality of backup firmware images including a last stored firmware update image and another backup firmware update image, a replacement firmware image based on a status of at least one backup firmware image, wherein the status of the backup firmware image indicates a reliability of the backup firmware image, and wherein each of the current firmware image, the last stored firmware update, and the other backup firmware update are separate, including
    selecting from the plurality of backup firmware images, a last-stored backup firmware image;
    determining whether a status of the last-stored backup firmware image is bad;
    if the status of the last-stored backup firmware image is bad, selecting another backup firmware image as the replacement firmware image; and
    if the status of the last-stored backup firmware image is not bad, determining whether the current firmware image substantially matches the last-stored backup firmware image;
    if the current firmware image does not substantially match the last-stored backup firmware image, selecting the last-stored backup firmware image as the replacement firmware image; and
    if the current firmware image does substantially match the last-stored backup firmware image, selecting another backup firmware image as the replacement firmware image; and
    storing the selected replacement firmware image in the firmware memory.

2. The apparatus of claim 1 wherein selecting the replacement firmware image includes:
    if the current firmware image does match the last-stored backup firmware image, setting the status of the last-stored backup firmware image to bad.

3. The apparatus of claim 1 further comprising computer program instructions that when executed by the computer processor cause the apparatus to carry out the steps of:
    identifying a new firmware image;
    determining whether a status of the last-stored backup firmware image is good, wherein the last-stored backup firmware image is stored in a first backup location;
    if the status of the last-stored backup firmware image is not good, storing the new firmware image in the first backup location; and
    if the status of the last-stored backup firmware image is good, storing the new firmware image in a second backup location.

4. The apparatus of claim 3 further comprising computer program instructions that when executed by the computer processor cause the apparatus to carry out the steps of setting a status of the new firmware image to new.

5. The apparatus of claim 1, wherein the component is a Unified Extensible Firmware Interface ('UEFI').

6. A computer program product for correcting a failure associated with a current firmware image, the computing system storing a plurality of different firmware images for the same firmware, the computer program product disposed upon a non-transitory computer readable storage medium, the computer program product comprising computer program instructions that when executed by a computer cause the computer to carry out the steps of:
    detecting a failure associated with a current firmware image stored in firmware memory;
    in response to detecting the failure, selecting from a plurality of backup firmware images including a last stored firmware update image and another backup firmware update image, a replacement firmware image based on a status of at least one backup firmware image, wherein the status of the backup firmware image indicates a reliability of the backup firmware image, and wherein each of the current firmware image, the last stored firmware update, and the other backup firmware update are separate, including
    selecting from the plurality of backup firmware images, a last-stored backup firmware image;
    determining whether a status of the last-stored backup firmware image is bad;
    if the status of the last-stored backup firmware image is bad, selecting another backup firmware image as the replacement firmware image; and
    if the status of the last-stored backup firmware image is not bad, determining whether the current firmware image substantially matches the last-stored backup firmware image;
    if the current firmware image does not substantially match the last-stored backup firmware image, selecting the last-stored backup firmware image as the replacement firmware image; and if the current firmware image does substantially match the last-stored backup firmware image, selecting another backup firmware image as the replacement firmware image; and storing the selected replacement firmware image in the firmware memory.

7. The computer program product of claim 6 wherein selecting the replacement firmware image includes:

if the current firmware image does match the last-stored backup firmware image, setting the status of the last-stored backup firmware image to bad.

8. The computer program product of claim 6 further comprising computer program instructions that when executed by a computer cause the computer to carry out the steps of:

identifying a new firmware image;

determining whether a status of the last-stored backup firmware image is good, wherein the last-stored backup firmware image is stored in a first backup location;

if the status of the last-stored backup firmware image is not good, storing the new firmware image in the first backup location; and if the status of the last-stored backup firmware image is good, storing the new firmware image in a second backup location.

9. The computer program product of claim 8 further comprising computer program instructions that when executed by a computer cause the computer to carry out the step of setting a status of the new firmware image to new.

10. The computer program product of claim 6, wherein the component is a Unified Extensible Firmware Interface ('UEFI').

* * * * *